United States Patent [19]

Takahashi

[11] 4,081,805
[45] Mar. 28, 1978

[54] APPARATUS FOR DISPLAYING THE AMOUNT OF EXPOSURE IN A SINGLE LENS REFLEX CAMERA USING AN ELECTRONIC SHUTTER

[75] Inventor: Akira Takahashi, Tokyo, Japan

[73] Assignee: Ricoh Co., Ltd., Tokyo, Japan

[21] Appl. No.: 696,192

[22] Filed: Jun. 15, 1976

Related U.S. Application Data

[63] Continuation-in-part of Ser. No. 494,328, Aug. 2, 1974, abandoned.

[30] Foreign Application Priority Data

Aug. 10, 1973 Japan .................................. 48-89813

[51] Int. Cl.² .............................................. G03B 7/00
[52] U.S. Cl. ................................ 354/60 L; 354/23 D; 354/53
[58] Field of Search .................. 354/23 D, 24, 53, 54, 354/60 E, 60 R, 60 L

[56] References Cited

U.S. PATENT DOCUMENTS

| | | | |
|---|---|---|---|
| 3,592,113 | 7/1971 | Wasielewski | 354/60 L |
| 3,800,305 | 3/1974 | Ogiso et al. | 354/60 L |
| 3,818,495 | 6/1974 | Sagara et al. | 354/23 D |
| 3,824,608 | 7/1974 | Toyoda | 354/60 R |
| 3,955,892 | 5/1976 | Numata et al. | 354/23 D |
| 3,967,288 | 6/1976 | Yamamoto | 354/53 |
| 3,968,502 | 7/1976 | Shiozawa et al. | 354/24 |

Primary Examiner—Russell E. Adams
Attorney, Agent, or Firm—Cooper, Dunham, Clark, Griffin & Moran

[57] ABSTRACT

An apparatus for displaying the amount of exposure in a single lens reflex camera using an electronic shutter in which the shutter speed can be established either automatically or manually and can be displayed in a digital manner. When the shutter speed is manually established, the apparatus indicates an underexposure or overexposure, beyond a selected range, and also displays the amount by which the established value deviates outside the range.

6 Claims, 15 Drawing Figures

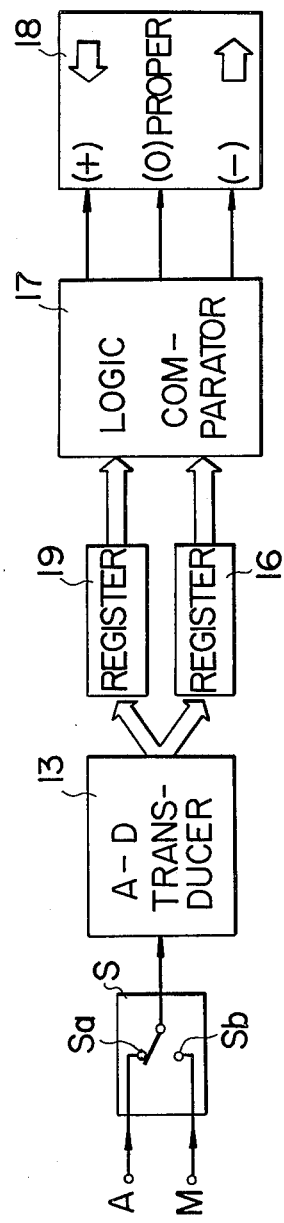
F I G. 7

SENSE AMP.   ADDITION CIR'T 4,081,805

APPARATUS FOR DISPLAYING THE AMOUNT OF EXPOSURE IN A SINGLE LENS REFLEX CAMERA USING AN ELECTRONIC SHUTTER

CROSS REFERENCE TO RELATED APPLICATION

This is continuation-in-part of applicant's copending application Ser. No. 494,328 executed July 25, 1974 and filed on or about Aug. 2, 1974 for METHOD AND APPARATUS FOR DISPLAYING THE AMOUNT OF EXPOSURE IN A SINGLE LENS REFLEX CAMERA USING AN ELECTRONIC SHUTTER, Attorney's Docket No. 13,845 now abandoned.

BACKGROUND OF THE INVENTION

The invention relates to a single lens reflex camera using an electronic shutter, and more particularly to an apparatus for digitally displaying the amount of exposure in an automatic mode as well as that when the shutter speed is manually established.

In a single lens reflex camera using an electronic shutter, an A-D converter is used in the electronic shutter to provide a digital storage of a photometric value. Referring to FIG. 1 which schematically shows a conventional electronic shutter incoporating an A-D converter, light P which is transmitted through a photographic lens is converted into a voltage by a photoelectric transducer 1, the output of which is supplied to an analogue arithmetic unit 2 which provides a modification in accordance with the established film sensitivity (ASA-value) and F-value. The output of the arithmetic unit 2 is supplied to an A-D converter 3 through an automanual change-over switch S which is thrown to the auto position at this time. This switch actually comprises an electronic switch. The A-D converter 3 has a storage capability so that when a locking switch SF is closed, the photometric value from the arithmetic unit 2 is stored therein as a digital quantity. When the shutter is released, the locking switch SF is opened, whereby the photometric output stored in the A-D converter 3 is converted into seconds by means of a "second" counter 4 for operating a shutter operating magnet 5.

On the other hand, when the shutter speed is manually established, a desired shutter speed can be manually established by means of a variable resistor 6. In this instance, the A-D converter 3 and following components function automatically. Thus, a quasi-analogue voltage produced across the variable resistor 6 is applied to the A-D converter 3 through the electronic switch S in its manual position for operating the shutter in the similar manner as in the automatic mode. It will be noted that if the potential at the input $b$ of the A-D converter 3 which is derived by the manual setting of the variable resistor 6 is equal to the potential at the output $a$ of the arithmetic unit 2, there occurs no choice between the auto and manual modes, implying that a proper exposure is obtained Hence, when the shutter speed is manually established, the resulting amount of exposure can be displayed by a comparison of the potentials at the points $a$ and $b$.

SUMMARY OF THE INVENTION

It is a principal object of the invention to provide an apparatus for displaying the agreement between a manually established exposure and an automatically established exposure, and any deviation therebetween, by storing the output of an analogue arithmetic unit in an A-D converter or other means and momentarily storing a manually established voltage in a register comprising a logic circuit for the purpose of subsequent comparison therebetween.

BRIEF DESCRIPTION OF THE DRAWINGS

FIG. 7 is a block diagram showing a modification of FIG. 6;

DETAILED DESCRIPTION OF THE EMBODIMENTS

Figure 1:
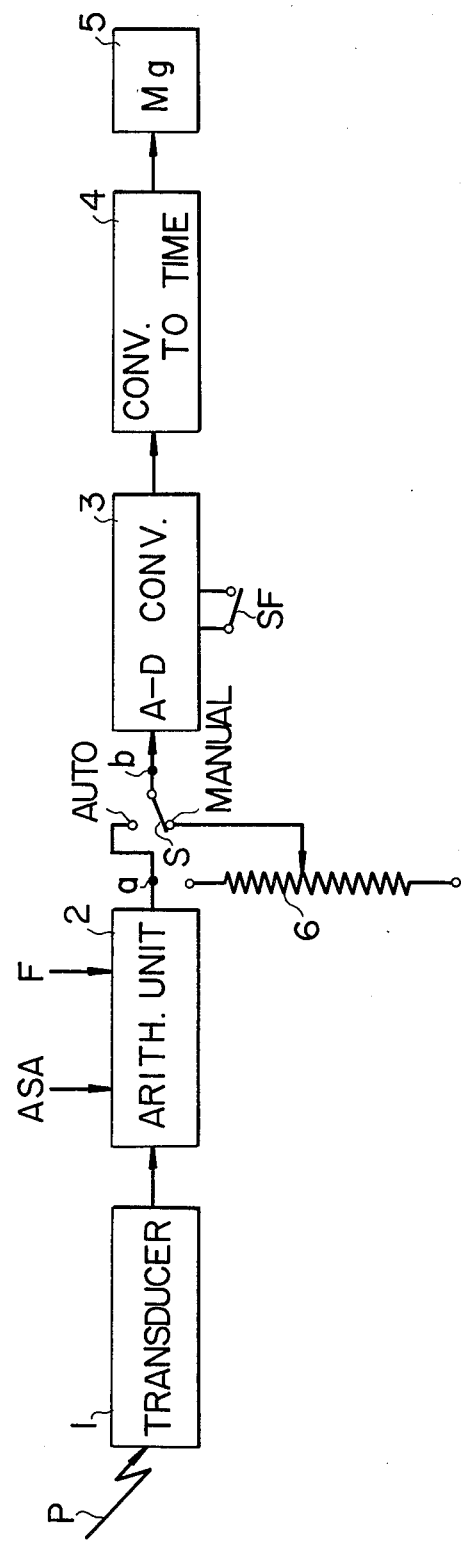
FIG. 1 is a block diagram showing the electrical circuit of a conventional digital electronic shutter.
Figure 2:
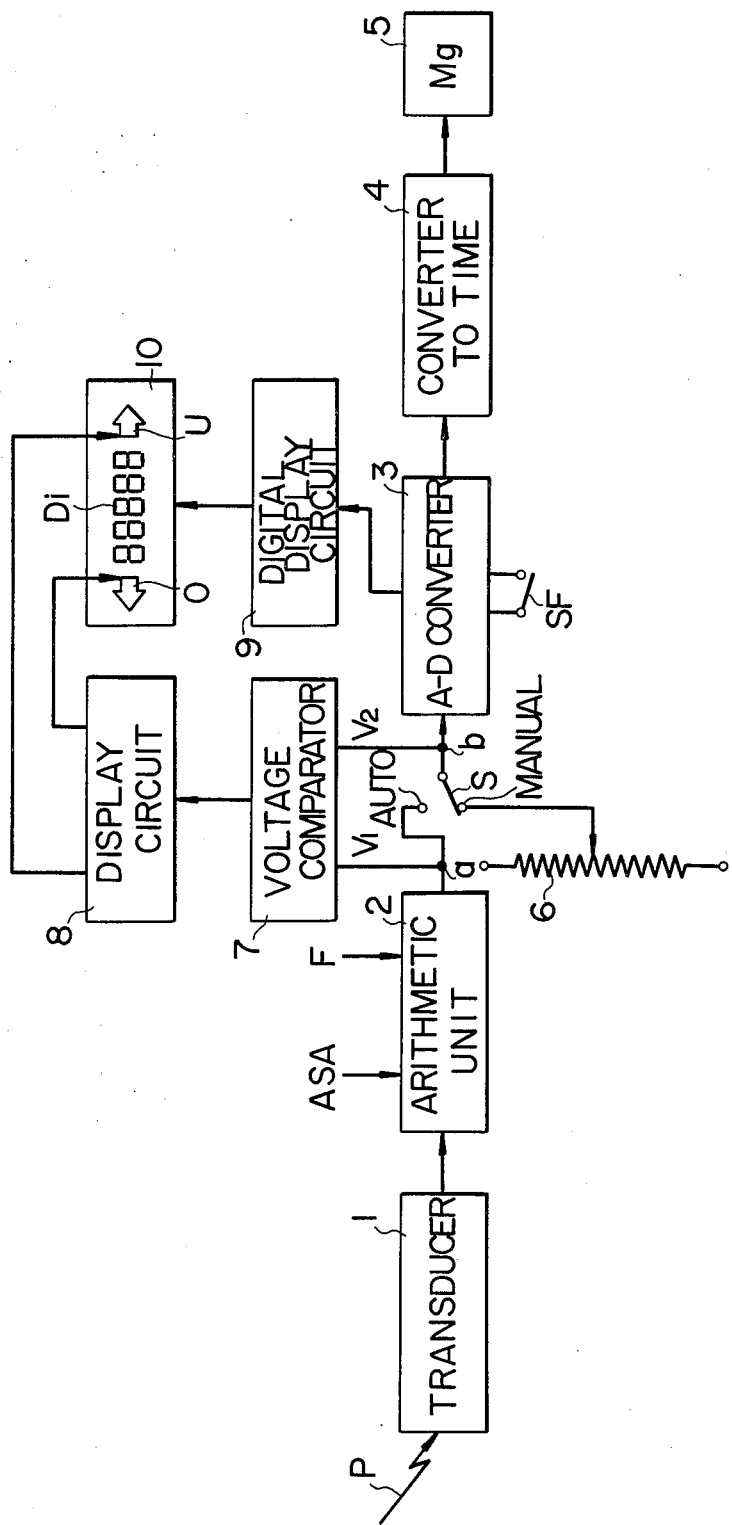
FIG. 2 is a similar block diagram to FIG. 1, but illustrating one embodiment of the invention.

Referring initially to FIG. 2, the same components as shown in FIG. 1 are designated by corresponding reference characters. Additionally, the apparatus shown in FIG. 2 includes a voltage comparator 7, an under-over display circuit 8, a digital display circuit 9 and a display unit 10 having a pair of arrows labelled U and O, as shown. when the change-over switch S is thrown to the manual position, an output voltage from variable voltage generator 6 which is manually selected in accordance with a shutter speed is compared against an output voltage from the analogue arithmetic unit 2, which corresponds to a proper exposure, in voltage comparator 7, the polarity of the output voltage of which is displayed by illuminating either arrow U or O through the display circuit 8 depending on whether the selected shutter speed is above or below a proper value. A dead zone is established such that neither arrow is illuminated when the output voltage from the voltage comparator 7 has an absolute value which is below a given magnitude, indicating that the shutter speed is within a proper range.

Figure 3:
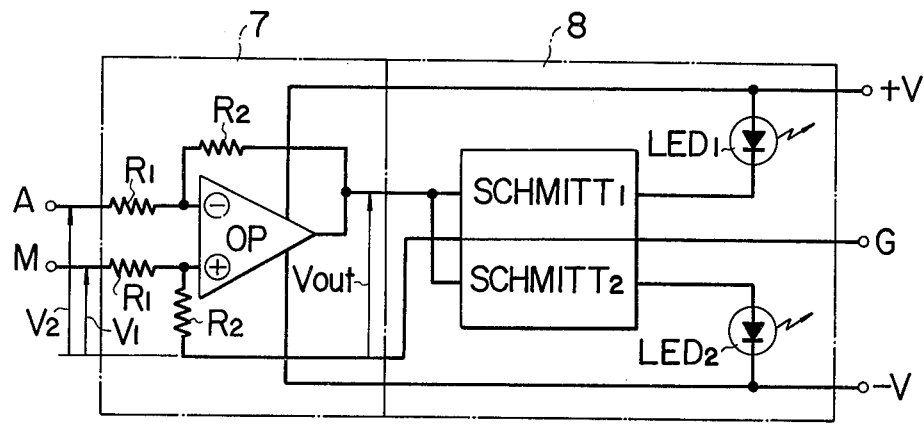
FIG. 3 is a more detailed block diagram of the principal part of FIG. 2.
Figure 4:
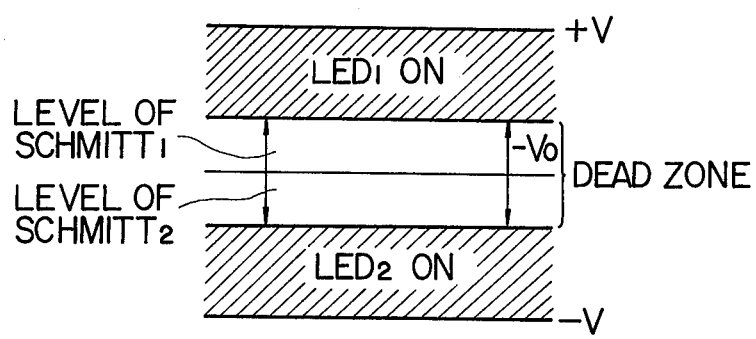
FIG. 4 is a schematic view illustrating the dead zone of the embodiment shown in FIG. 2.
Figure 5:
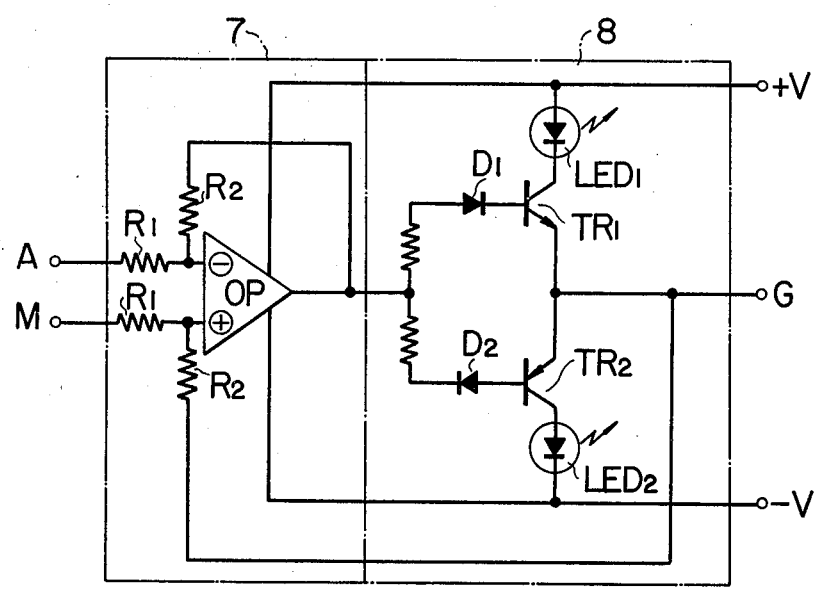
FIG. 5 is a block diagram illustrating a modification of FIG. 3.

A specific example of the voltage comparator 7 and the display circuit 8 is shown in FIG. 3 wherein an input terminal A is supplied with an output voltage $V_2$ from the analogue arithmetic unit 2 which corresponds to a proper exposure while an input terminal M is supplied with an output voltage $V_1$ from the variable voltage generator 6 which corresponds to a manually selected shutter speed. An amplifier OP provides an output voltage $V_{out} = R_2/R_1(V_1 - V_2)$. If this voltage is positive, a Schmitt circuit 1 is operated to energize a luminescent diode $LED_1$, illuminating either one of the arrows U, O, and if the voltage is negative, another Schmitt circuit 2 is operated to energize another luminescent diode $LED_2$, illuminating the other arrow. In this manner, a display is provided indicating whether the selected shutter speed is above or below a proper value. It is necessary to provide a dead zone in which neither of the Schmitt circuits is operated, and hence neither luminescent diode $LED_1$, $LED_2$ is energized if the shutter speed remains within a proper range. If the auto information $V_2$ varies by $V_a$ per 1EV and it is desired to provide a dead zone of nEV, the range of $V_O$ shown in FIG. 4 may be equal to $nV_a$, so that the gain of OP may be set equal to $V_O/nV_a = R_2/R_1$. The display circuit 8 may comprise an NPN transistor TR1 and a PNP transistor TR2 as shown in FIG. 5. In this Figure, diodes $D_1$ and $D_2$ prevent an excessively high reverse voltage from being applied across the base and emitter of the transistors in the event of a large deviation from a proper value.

Figure 6:
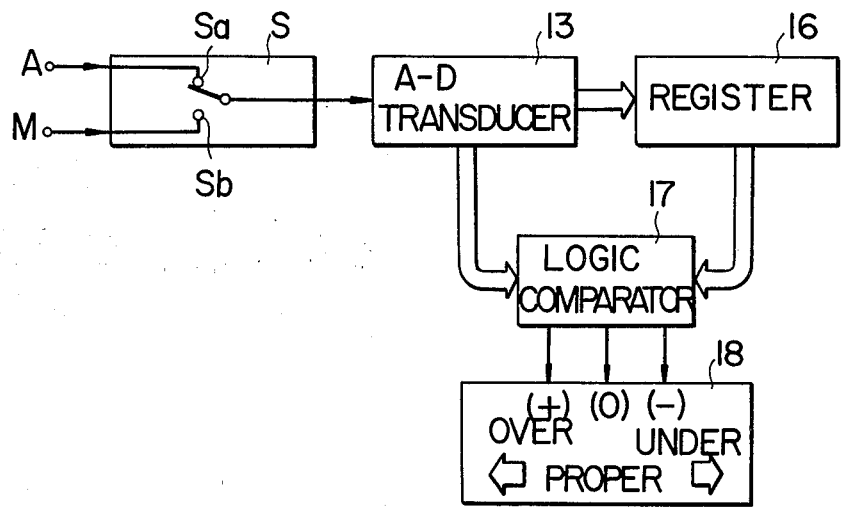
FIG. 6 is a block diagram of a second embodiment of the invention.

The auto output voltage from the analogue arithmetic unit as mentioned above in connection with FIG. 1 is adapted to be applied as shown in FIG. 6 to the auto terminal Sa of the manual-automatic change-over switch S which comprises an electronic switch, while the quasi-analogue voltage produced across the variable resistor 6 is applied to the manual terminal Sb of the switch S. The switch S is also referred to as an analogue switch comprising a semiconductor element, and is adapted to be automatically switched at a definite time interval to apply the auto output voltage and the quasi-analogue voltage alternately to the A-D converter 3, which converts each of such applied voltages into a digital form. The converter 3, shown as A-D transducer 13, delivers the information supplied from the manual terminal Sb to a register 16, and also stores the auto information supplied from the auto terminal Sa. At this end, the A-D converter also functions as a register to store the auto information. The manual information delivered from the A-D converter 13 to the register 16 is momentarily stored in the register 16 which may comprise a logical circuit such as a shift register, latch or the like. The manual information momentarily stored in the register 16 and the auto information retained by the A-D converter 13 are compared against each other in a logic comparator 17. The logic comparator 17 is of a conventional construction, and produces a proper signal (O) when the magnitudes to be compared are within a predetermined range of each other, and an improper signal (+, −) when the magnitudes are outside the range. The produced signal is applied to a display unit 18 to provide a display by means of luminescent action. Thus, a proper signal (O) provides a corresponding display, while an improper signal (+, −) produces a display of "over" or "under". Specifically, when the auto information is less than the manual information in magnitude, a display of "over" is produced, while when the manual information is less in magnitude than the auto information, a display of "under" is produced. As indicated, the display may be provided in the form of arrows.

In this manner, when a shutter speed is manually established, the invention enables the elctronic shutter to be conveniently utilized to provide a display of whether or not the established value agrees with a proper value which is automatically determined.

While in the above description, the storage of the auto information has been achieved by the holding capability of the A-D converter 13, an alternative scheme is shown in FIG. 7 where another register 19 is provided to store the auto information that is digitalized by the A-D converter 13, the former supplying its output to the logic comparator 17.

Figure 8:
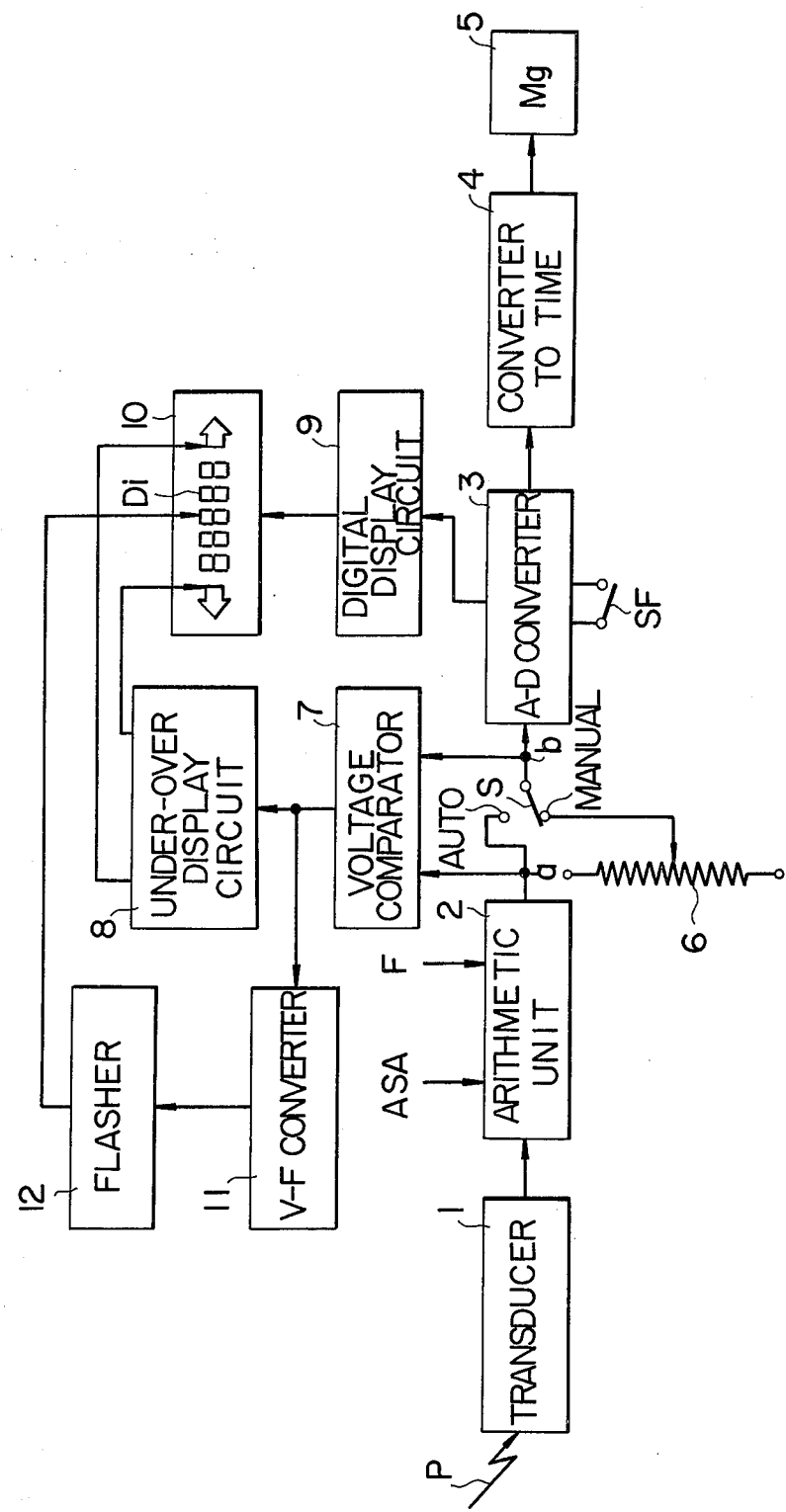
FIG. 8 is a block diagram showing a third embodiment of the invention.
Figure 9:
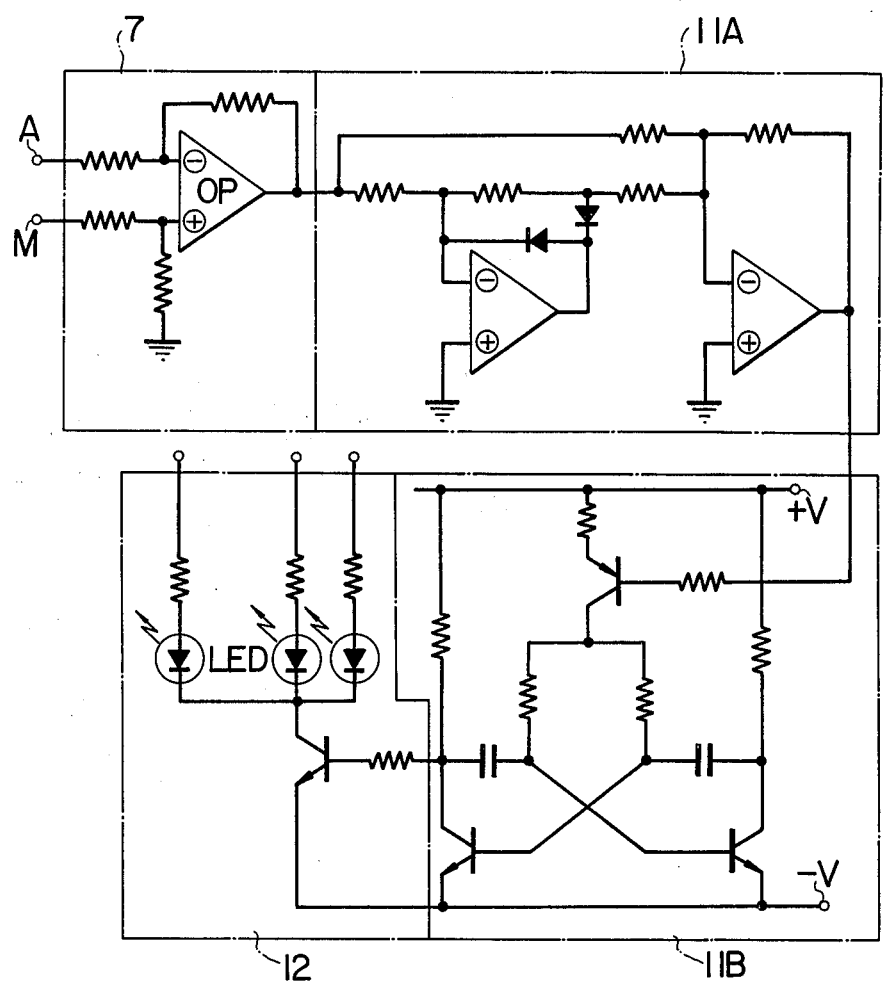
FIG. 9 is a more detailed block diagram of the principal part of FIG. 8.

While in the preceding embodiments, only the display is provided of whether or not the manually established exposure agrees with the proper exposure which is automatically determined, it will be more convenient if the amount of deviation outside the proper range can be displayed. Such an embodiment is shown in FIGS. 8 and 9, and includes the circuit arrangement according to the embodiment shown in FIG. 2. Additionally, the embodiment of FIGS. 8 and 9 includes a V-F converter circuit 11 and a flasher circuit 12. The converter circuit 11 operates to convert the output voltage from the voltage comparator 7 into a frequency, with which a luminescent diode LED shown as digital display component $D_i$ is flashed so as to indicate the manually established shutter speed. Specifically, the flashing occurs at a slot rate when a deviation of the manually selected shutter speed from the proper value is large, while the period of flashing is reduced as the proper value is approached until the flickering becomes invisible when the shutter speed is within the proper range.

FIG. 9 shows a specific circuit arrangement used for this purpose. An absolute value amplifier 11A amplifies the absolute value of the output from the voltage comparator 7 and supplies the amplified output to a stable multivibrator 11B to cause a change in the oscillation frequency thereof. The output of the multivibrator is supplied through a transistor to the common cathodes of respective luminescent diodes LED which constitute together the digital display component $D_i$ for the shutter speed, thus flashing these luminescent diodes with the oscillation frequency thereof.

Figure 10:
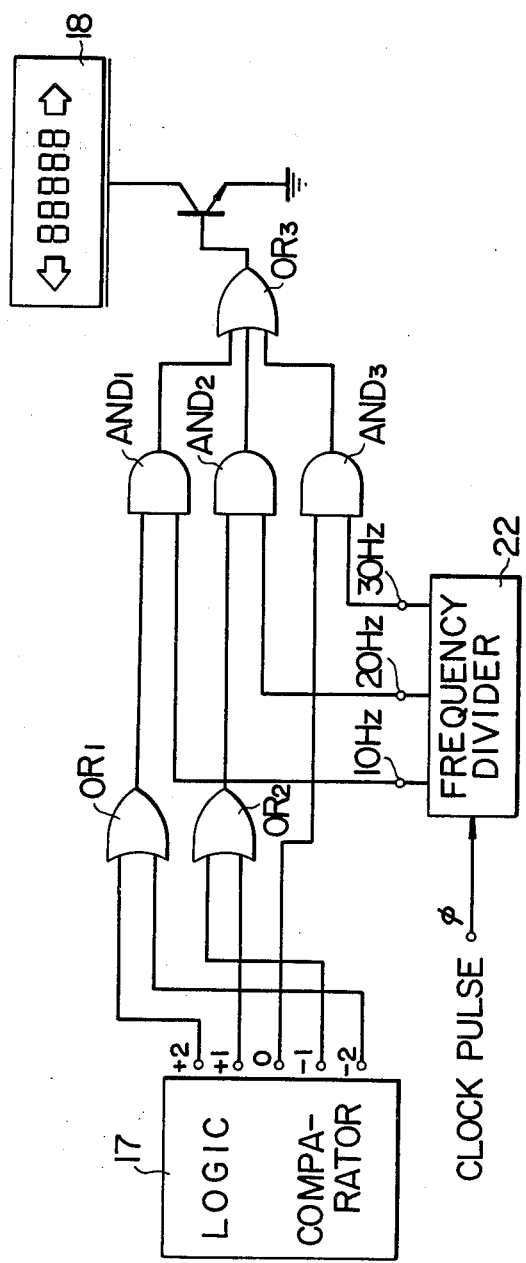
FIG. 10 is a block diagram of a fourth embodiment of the invention.

Another embodiment providing a flashing display is shown in FIG. 10 in which a frequency divider 22 is arranged between the logic comparator 17 and the luminescent display unit 18, both shown in FIG. 6. The frequency divider 22 operates to vary the period of flashing of the luminescent display, allowing the magnitude of the period to provide a measure of the deviation from the proper value. Specifically, the output of the logic comparator 17 is divided into steps of +2, +1, 0, −1, and −2, which are applied to OR circuits $OR_1$, $OR_2$, $OR_3$ and AND circuits $AND_1$ to $AND_3$ together with the outputs from the frequency divider 22. The frequency divider 22 is supplied with a clock pulse $\phi$ having a constant period, and the arrangement is such that the period of the pulse is changed in accordance with the output from the comparator 17 before being applied to the display unit 18. Assuming that the pulse $\phi$ has the frequency of 30Hz, for example, the output from the comparator 17 will be 0 for a proper value, so that the "proper" display by the display unit 18 will be illuminated at a frequency of 30Hz. If the output from the comparator 17 is offset by −1 step from the proper value, this output will cause the frequency of the clock pulse $\phi$ to be frequency divided to 20 Hz, which is applied to the display unit 18, whereby the symbol (−) and the rightward directed ("under") arrow will be illuminated at a period of 20Hz. Such period of flashing permits a recognition that the manually established value is only slightly offset from the proper value. If the output from the comparator 17 is offset from the proper value by +2 steps, this output will cause the frequency of the clock pulse $\phi$ to be frequency divided to 10Hz, which is applied to the display unit 18 to cause a flashing of symbol (+) and the leftward directed ("over") arrow at a period of 10Hz. Consequently, it is possible to know that the manually established value is greatly offset in the direction of overexposure. In this manner, a change in the period of flashing of the luminescent display permits an approximate deviation from the proper value to be determined.

Some of individual circuits have only been referred to rather functionally for convenience of illustration. The following will in turn give a further detailed explanation of an exemplary embodiment of each of these circuits.

Figure 11:
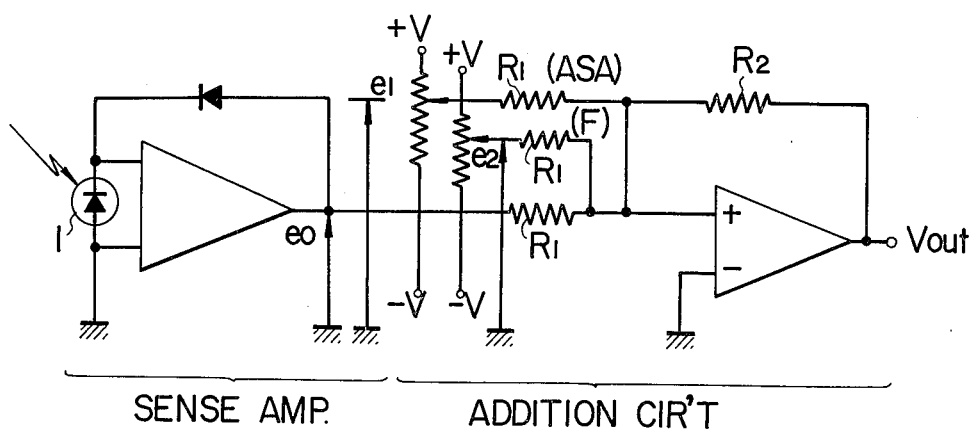
FIG. 11 is a more detailed block diagram of an arithmetic unit used in the invention.

Arithmetic Unit (FIG. 11)

The unit may be comprised of a zero-bias sensing amplifier and an addition circuit as well-known in the art. When resistance of each resistor and potential at each position shown are as denoted in this figure, the output Vout of the unit is given by the following equation.

$$V_{out} = -R_2/R_1 (l_1 + l_2 + l_0)$$

Figure 12:
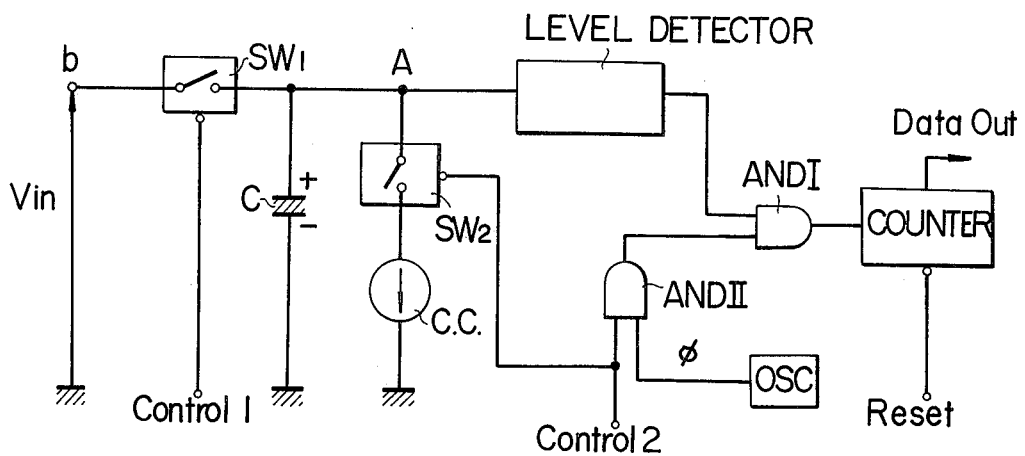
FIG. 12 is a more detailed block diagram of an A-D converter.

A-D Converter (FIG. 12)

This is constructed as shown in FIG. 12. In operation, a counter which may be any of coventional ones and however comprises a series of flip-flops in this embodiment is first reset and at the same time a switch SW1 which may be an electronic switch is switched on through a control signal (control 1) in the form of a pulse so that a capacitor C is rapidly charged until the voltage thereacross becomes equal to an input voltage Vin at terminal b. Then, another control signal (control 2) which may be originated immediately after the ceasing of the signal (control 1) by suitable means is fed to another switch SW2 and one input of an AND gate ANDII the other input of which is connected to a clock pulse generator OSC and the output of which is connected to one input of another AND gate ANDI whereupon the charge of capacitor C is discharged through switch SW2 and a constant current circuit C.C. A level detector detects a potential at the positive side of capacitor C, i.e., point A to feed an output to the other input of gate ANDI such that when the potential exceeds a predetermined level somewhat higher than the zero or ground level, an output of a high level is fed to gate ANDI to open the same so as to allow pulses from generator OSC to be fed to the counter whereas when the potential is below the predetermined level, another output of a low level is fed to close gate ANDI so as to cut off the pulses. The counter thus holds digital count therein which is representative of shutter speed.

Figure 13:
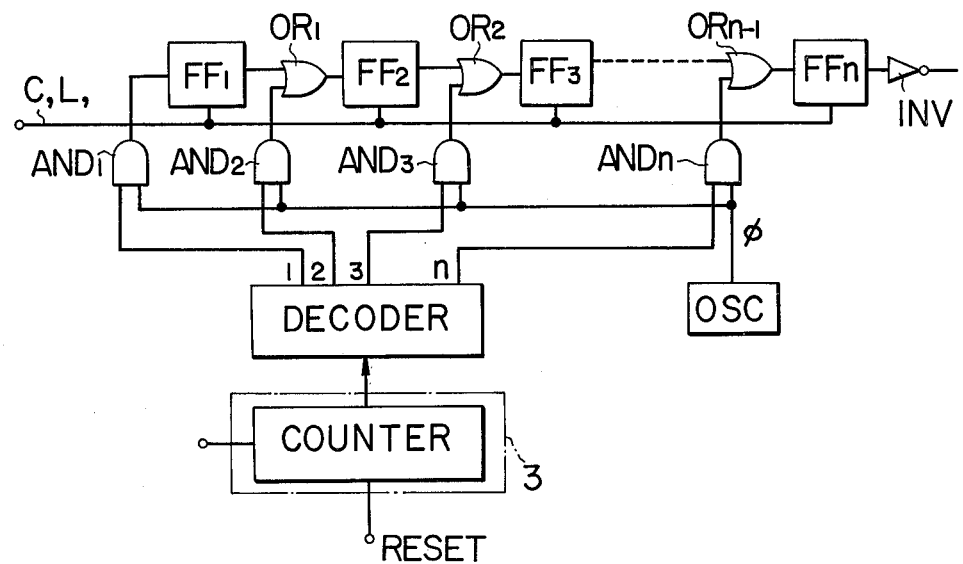
FIG. 13 is a more detailed block diagram of a to-time converter.

Converter To Time (FIG. 13)

This converter mainly comprises a decoder having $n$ outputs the input of which is connected to the counter in FIG. 12 and a series of $n$ flip-flops FF1 to FFn the output of the last one FFN of which is fed through an inverter INV to a magnet for driving a second shutter blade. The $n$ outputs of the decoder are respectively connected to one input of $n$ AND gates AND1 to ANDn the other inputs of which are each connected to a clock pulse generator OSC. The output of the first one AND1 of the AND gate is fed to the first one FF1 of the flip-flops. The output of the second gate AND2 is fed together with the output of flip-flop FF1 to the second flip-flop FF2 through an OR gate OR1, similarly, the output of the third gate AND3 is fed together with the output of flip-flop FF2 to the third flip-flop FF3 through an OR gate OR2 and so on. C.L. designates a line for supplying a clear signal to each of the flip-flops. The operation of this circuit will not be described as it is self-evident to those skilled in the art.

Figure 14:
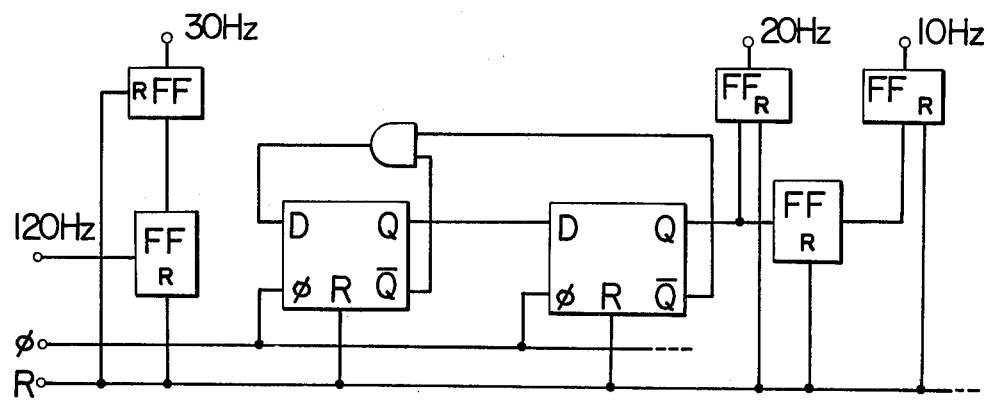
FIG. 14 is a more detailed block diagram of a frequency divider used in the FIG. 10 embodiment.

Frequency Divider (FIG. 14)

This may be constructed by using five flip-flops and two latches arranged as shown in FIG. 14. $\phi$ designates a clock pulse train as before to be fed to one input $\phi$ of each of the latches.

Figure 15:
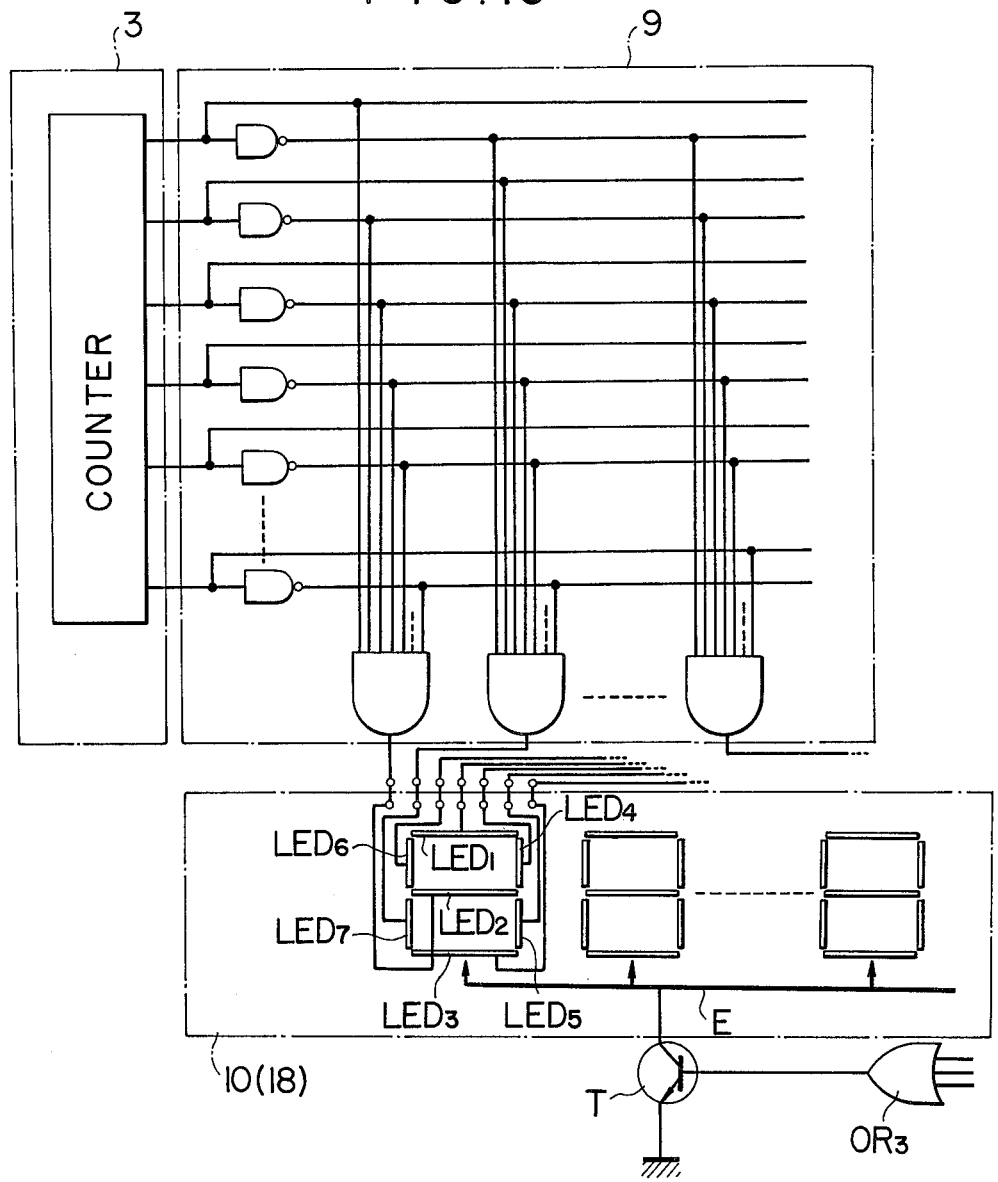
FIG. 15 is a more detailed block diagram of a combination of a digital display circuit and a light emitting display device used in the invention.

Digital Display Circuit and Light Emitting Display Device (FIG. 15)

The display circuit comprises a gate-matrix decoder whereas the display device comprises a series of groups of seven light emitting diodes LED1 to LED7 arranged in the form of numeral 8. One polarity of each of the diodes is connected to respective outputs of the decoder whereas the other polarity is connected to an elongated electrode E connected to the collector of a transistor T the ermitter of which is grounded so that when a pulse train (30Hz, 20Hz or 10Hz) is fed to the base of the transistor T, the energized diodes may flash at the same frequency as that of the pulse train.

What is claimed is:

1. A camera of the type having an electronic shutter, said camera comprising:
   means for automatically setting an exposure time and producing a first output signal in accordance with the magnitude thereof;
   means for manually setting an exposure time and producing a second output signal in accordance with the magnitude thereof;
   means for respectively receiving one of said first and second output signals and operating said electronic shutter in accordance with the magnitude of the received signal;
   means for respectively conducting one of said first and second output signals to said receiving means;
   first means responsive to said receivng means for indicating an exposure time corresponding to the received signal in said receiving means;
   means for comparing the magnitude of said first and second output signals and producing a comparative result; and
   second means responsive to said comparing means for indicating the comparative result.

2. A camera according to claim 1 wherein said second indicating means comprises means for sensing the comparative result in its magnitude and producing an indicative signal in one of three ranges and means for displaying the comparative result in one of three displaying modes corresponding to said three ranges respectively.

3. A camera according to claim 2 wherein said sensing means comprises a Schmitt circuit.

4. A camera according to claim 2 wherein said second indicating means further comprises means for dividing the comparative result, when said indicative signal falls within the middle one of said three ranges in its magnitude, into one of a plurality of steps, the middle one of which corresponds to zero and further means for displaying the comparative result in one of a plurality of displaying modes corresponding to said plurality of steps respectively.

5. A camera according to claim 1 wherein said second indicating means comprises light-emitting means for displaying the comparative result and means for causing light from said light-emitting means to be interrupted at a frequency in accordance with the magnitude of the comparative result.

6. A camera according to claim 1 wherein said comparing means comprises means for momentarily storing one of said first and second output signals prior to their comparison.

* * * * *